United States Patent [19]
Rendall

[11] Patent Number: 5,505,823
[45] Date of Patent: Apr. 9, 1996

[54] METHOD FOR THE ELECTROLYTIC PRODUCTION OF ALUMINUM

[75] Inventor: John S. Rendall, Albuquerque, N.M.

[73] Assignee: Solv-Ex Corporation, Albuquerque, N.M.

[21] Appl. No.: 300,441

[22] Filed: Sep. 2, 1994

[51] Int. Cl.$^6$ .................... C25C 3/06; C25B 1/00
[52] U.S. Cl. .................... 205/354; 205/361; 205/372
[58] Field of Search .................... 204/64, 243 R, 204/245, 60, 61

[56]  References Cited

U.S. PATENT DOCUMENTS

| 1,995,343 | 3/1935 | Fleischer | 23/260 |
| 2,827,366 | 3/1958 | Saeman | 23/273 |
| 2,883,273 | 4/1959 | Seaman | |

OTHER PUBLICATIONS

American Institute of Chemical Engineers, "Development of Sulfuric Acid Process"—pp. 58–73.
Feb. 1962, Journal of Metals; "Alumina by Acid Extraction" by T. R. Scott; pp. 121–125.
LMA, Apr. 1961; "Aluminum From Clay".
Feb. 1944; "The Kalunite Process" by Arthur Fleischer, Member of A.I.M.E.; pp. 266–279.
Swedish Nat'l Committee, World Power Conference, Paper No. D10 by Prof. W. Palmaer "An Electrolytic Method of Removing Small Quantities of Iron From Solutions of Aluminium Salts"; pp. 626–633.
Nat'l Geographic, vol. 154, No. 2, Aug. 1978; "Aluminum, the Magic Metal" by Thomas Y. Canby; photos by James L. Amos; pp. 186–211.
U.S. Dept. of Interior, Bureau of Mines, 1963; R1 Bureau of Mines Report of Investigations 6290; "Methods for Producing Alumina From Clay", An Evaluation of a Potassium Alum Process; F. Peters; P. Johnson; R. Kirby.

Primary Examiner—Kathryn Gorgos
Attorney, Agent, or Firm—Thomas E. Schatzel

[57]  ABSTRACT

A process for smelting aluminum from a mixture of a double salt potassium-aluminum sulfate $2KAl(SO_4)_2$ and aluminum sulfate $Al_2(SO_4)_3$ with potassium sulfate $K_2SO_4$ having a weight ratio of $2KAl(SO_4)_2$ to $K_2SO_4$ in the range of 50/50 to 15/85. The mixture is heated to a eutectic temperature that makes it molten and electrolysis is used to precipitate out aluminum at the negative electrode and gases from $SO_4$ ions at the positive electrode. A critical amount of a feed of $2KAl(SO_4)_2$ is added to replace that which was consumed in the electrolysis and to maintain the weight ratio which provides for the low eutectic melting temperature.

3 Claims, 3 Drawing Sheets

COMPOSITIONS FOR MOLTEN SALT

| wt % | | FUSION BEGINS | RESOLIDI-FICATION | FINAL |
|---|---|---|---|---|
| $K_2SO_4$ | $KAl(SO_4)_2$ | deg C | deg C | deg C |
| 100.00 | 0.00 | 1060 | | 1070 |
| 86.14 | 13.86 | | | 770 |
| 72.98 | 27.02 | 590 | | 710 |
| 61.51 | 38.49 | 590 | | 710 |
| 50.31 | 49.69 | 610 | 650 | 710 |
| 40.40 | 59.60 | 610 | 670 | 730 |
| 30.95 | 69.05 | 630 | 690 | 730 |
| 22.52 | 77.48 | 670 | 675 | 730 |
| 14.52 | 85.48 | 670 | | 710 |
| 6.91 | 93.09 | 670 | | 710 |
| 0.00 | 100.00 | | | 730 |
| | | | | |
| $Na_2SO_4$ | $NaAl(SO_4)_2$ | | | |
| 84.23 | 15.77 | 640 | | 710 |
| 69.86 | 30.14 | 630 | | 720 |
| 57.68 | 42.32 | 630 | | 710 |
| 46.92 | 53.08 | 625 | 650 | 690 |

Fig_1

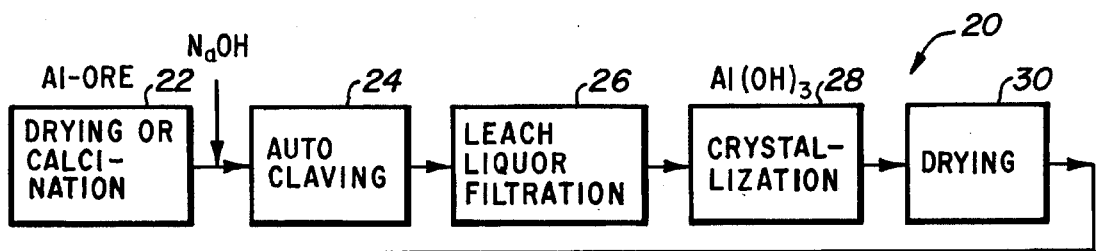
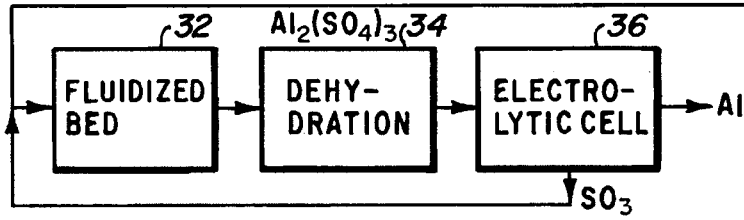
Fig_2
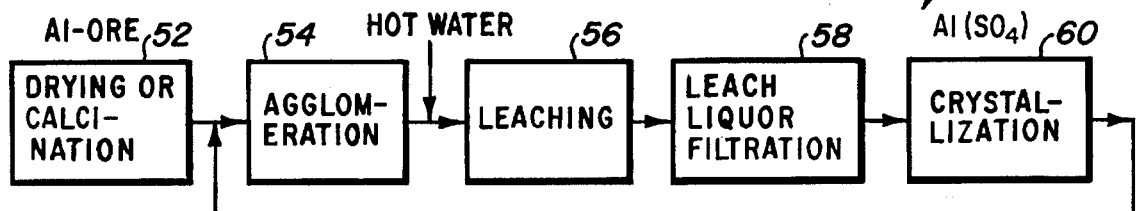
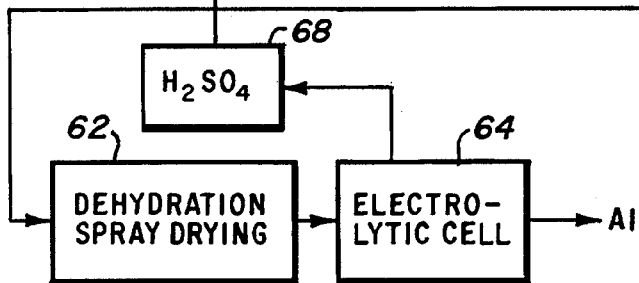
Fig_3
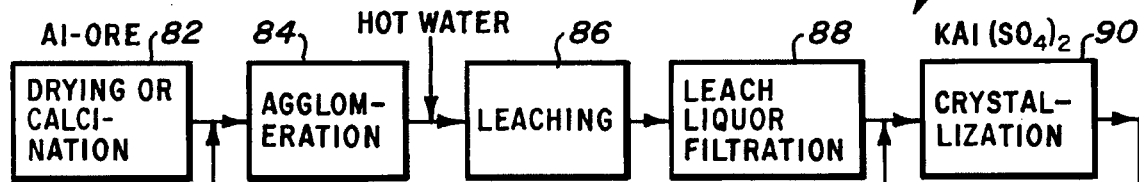
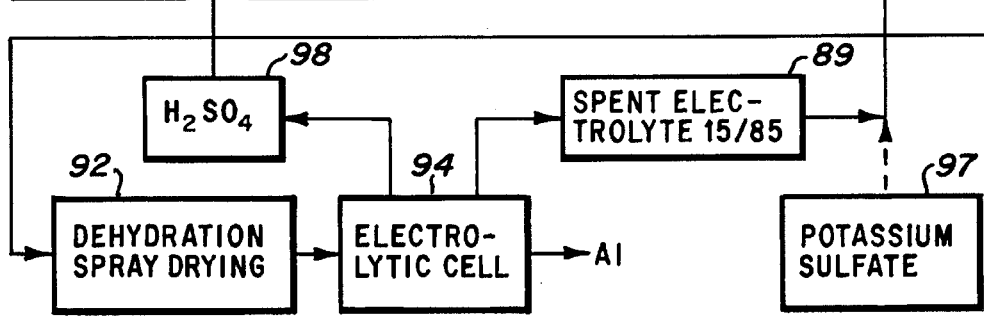
Fig_4

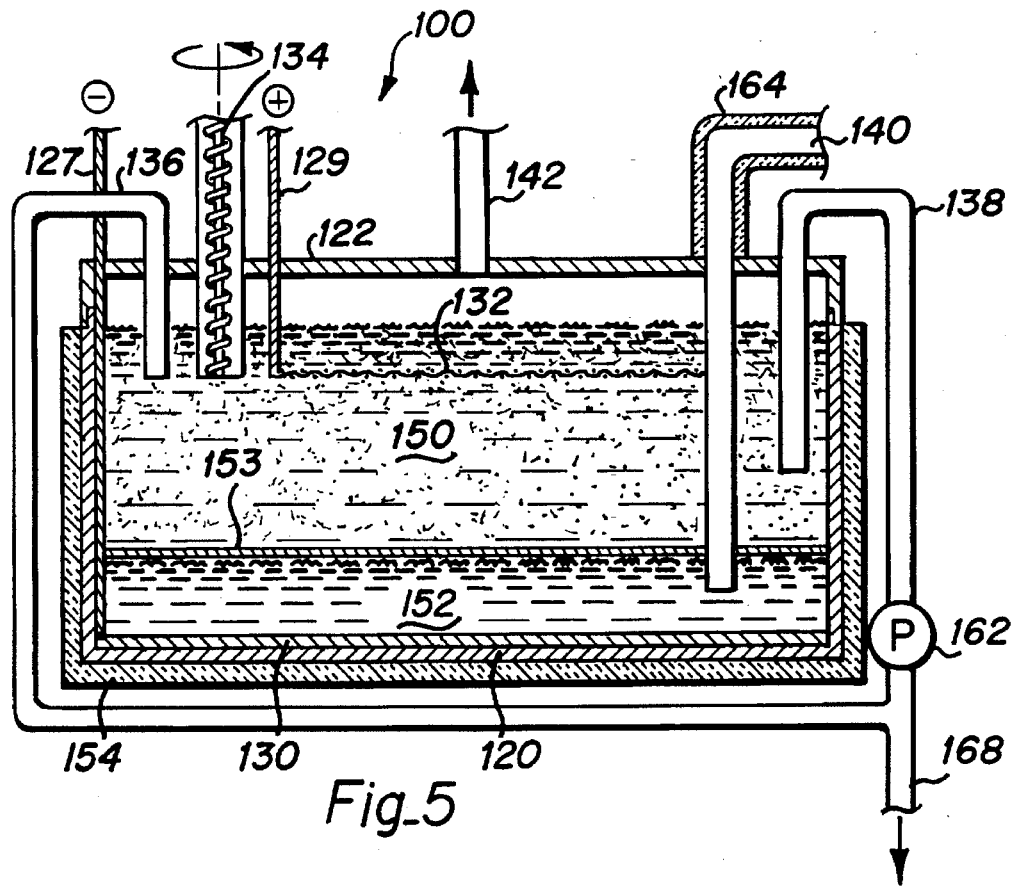
Fig_5
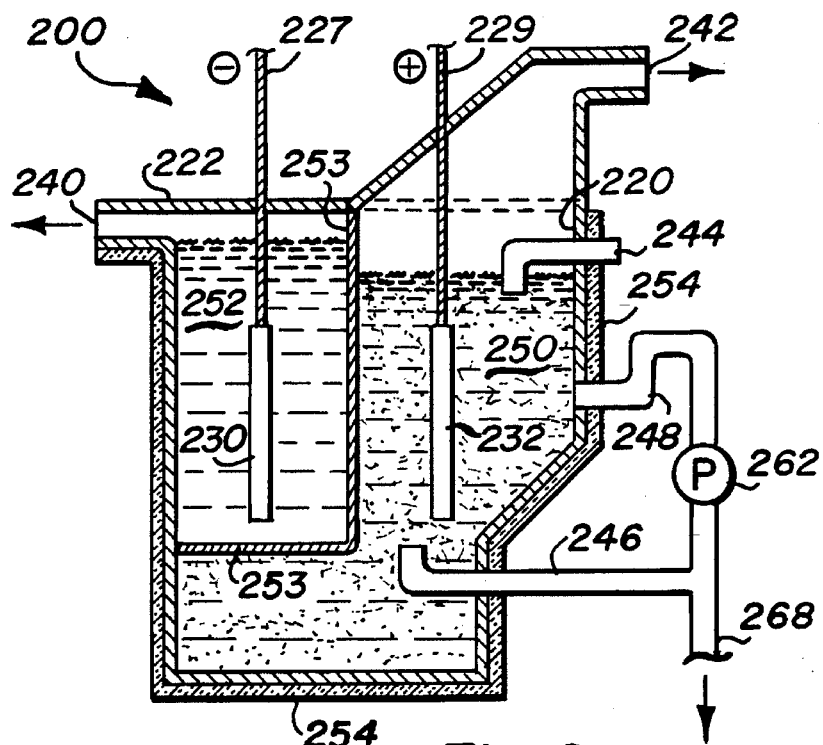
Fig_6

METHOD FOR THE ELECTROLYTIC PRODUCTION OF ALUMINUM

BACKGROUND OF THE INVENTION

1. Field of the Invention

The invention relates generally to the production of aluminum and more specifically to a method and an apparatus for producing aluminum ingots from ore using electrolysis of molten alkali-aluminum sulfate with alkali sulfates at a temperature of approximately 700 degrees Centigrade.

2. Description of the Prior Art

Aluminum smelting is a process characterized by low productivity per unit reactor (around 0.7 metric tons/day), a low thermal efficiency (about ten percent) and a high consumption of electrical energy (about thirteen to seventeen kWh/kg of aluminum). In practice, aluminum is deposited at the cathode with an electrolytic efficiency of 85–90%. All present technologies for aluminum smelting start with alumina ($Al_2O_3$) produced and refined by the Bayer process from bauxite using caustic compounds like sodium hydroxide (NaOH). The emphasis in research and development has been directed to the carbo-thermal reduction of alumina to aluminum at about 980 degrees Centigrade by the Hall-Heroult molten salt electrolysis using consumable carbon electrodes, where the alumina is dissolved in cryolite (aluminum-sodium flouride $AlNa_3F_6$) and aluminum is deposited electrolytically in molten form. The reactions are $$2Al_2O_3 + 3C \rightarrow 3CO_2 + 2Al_2;$$

and $$2Al_2O_3 + 6C \rightarrow 6CO + 2Al_2.$$

Changing process temperature can adjust the proportion of electrical energy and the proportions of carbon monoxide (CO) and carbon dioxide ($CO_2$) and thus the amount of carbon required. Modern Hall-Heroult cells operate at four to five volts and a current of about 200,000 amperes.

Scale and process efficiencies of both the Bayer process and the Hall-Heroult cell (both over one hundred years old) have been improved considerably but still warrant further development for better energy efficiency.

Alternative processes include chlorination with electrolysis of aluminum chloride and electrolytic decomposition of alumina using inert electrodes. Future developments rely on advances in material science relating to stable wettable materials for anodes and cathodes. Most likely such advances and process alternatives will be retrofitted to existing Hall-Heroult technology which is likely to dominate aluminum smelting for many more decades.

The goals of future process improvements include:

a) increased thermal efficiency and reduced energy consumption;
b) reduced production and labor cost (inert instead of consumable electrodes);
c) increased production efficiency by continuous instead of batch processing, which also reduces labor cost;
d) extended lifetime of the electrolytic cell;
e) facility to retrofit new developments to existing equipment; and
f) environmental acceptability including avoidance of environmental penalty costs concerning byproducts like gaseous carbon, fluorine and sulfur compounds as well as slag.

SUMMARY OF THE PRESENT INVENTION

The basic ingredient of the present invention is the double salt potassium-aluminum sulfate [$KAl(SO_4)_2$] or aluminum sulfate [$Al_2(SO_4)_3$] to be converted into $KAl(SO_4)_2$. $KAl(SO_4)_2$ and potassium sulfate ($K_2SO_4$) in a range of weight ratios (WR) from 50/50 to about 15,85, respectively, form a mixture with a low melting point at around 700 degrees Centigrade. The overall electrolysis reaction equation is $$2KAl(SO_4)_2 \rightarrow K_2SO_4 + Al_2 + 3(SO_3 + O) \tag{1}$$

and $$Al(SO_4)_3 \rightarrow Al_2 + SO_3 + O. \tag{2}$$

The cell principle is similar to and retrofittable to monopolar cells like the Hall-Heroult cell using horizontal electrodes, to the Down cell using vertical electrodes as well as to bipolar cells with multiple electrodes.

At a temperature of about 700 degrees Centigrade, electric current is passed through the electrodes and the molten mixture producing molten aluminum at the cathode and $SO_4$ ions at the anode. The aluminum is tapped off into ingots directly from the pool or by means of a siphon. The $SO_4$ ions decompose into $SO_3$ and $O_2$ gases rising according to their partial pressure on the liquid surface and can be utilized for producing sulfuric acid ($H_2SO_4$) by the reaction $$SO_3 + H_2O \rightarrow H_2SO_4 \tag{3}$$

when absorbed in sulfuric acid.

Feed materials for the electrolysis are

A) aluminum sulfate $Al_2(SO_4)_3$, according to the equation $$Al_2(SO_4)_3 + K_2SO_4 \rightarrow 2KAl(SO_4)_2; \text{ and} \tag{4}$$

B) potassium-aluminum sulfate $KAl(SO_4)_2$ directly, as a byproduct of oil production from certain oil sands, oil shales or other aluminum-bearing ores. This process recycles $KAl(SO_4)_2$ but requires removal of excess $K_2SO_4$ from the cell.

The process of equations (1) and (2) is used in a modified Hall-Heroult cell, which also recycles the potassium compounds within the process. According to the present invention, aluminum sulfate can be produced from aluminum hydroxide [$Al(OH)_3$], an intermediate product of the Bayer alumina refinement process, and the byproduct gases from equations (1) and (2) according to the reaction $$2Al(OH)_3 + 3SO_3 \rightarrow Al_2SO_4 + 3H_2O. \tag{5}$$

This step bypasses the energy-intensive calcination part of the Bayer process for the production of alumina [$Al_2O_3$], which requires temperatures around 1000 degrees Centigrade and consumes more than thirty percent of the total aluminum production energy.

An advantage of the present invention is the use of aluminum hydroxide as feedstock which bypasses the energy-intensive calcination part of the Bayer bauxite-to-alumina process.

Another advantage is the significantly lower operating temperature of about 700 degrees Centigrade, which substantially extends the cell life, compared to the existing Hall-Heroult process using cryolite as an electrolite at 940–980 degrees Centigrade.

Another advantage is the use of inert electrodes which are more economical than consumable high grade carbon electrodes.

Another advantage is the reduction of the electrolysis power consumption from about thirteen to seventeen kWh for alumina to about nine kWh per kg aluminum for sulfates as feed material.

Another advantage is the easy adaptation and retrofittability of this process to current Hall-Heroult cells avoiding expensive and time consuming development costs.

Another advantage is the use of potassium-aluminum sulfate $KAl(SO_4)_2$ as feedstock, which exists in the clay fraction resulting from the production of oil from oil sand and oil shales, as well as in the kaolinite, alunite, zeolite and clays which are found in Georgia.

Another advantage is the ability to maintain continuous processing instead of labor-intensive batch processing presently in use in the aluminum industry.

Another advantage is the substantial reduction of dust particle emission and the recycling of gaseous byproducts like $SO_3$ and $SO_2$ for the production of aluminum sulfate and sulfuric acid, thereby meeting stringent environmental standards.

Another advantage is the easy adaptation and retrofitability of the process to existing Hall-Heroult cells, thereby avoiding the cost of installing new facilities.

Another advantage is the significant increase of the electrolytic efficiency of aluminum production compared to that of the Hall-Heroult process because of electrolyte recycling.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 1 is a prior art table of the relationships of the mixture ratio of $K_2SO_4$ and $KAl(SO_4)_2$ and that of $Na_2SO_4$ and $NaAl(SO_4)_2$ versus temperature;

FIG. 2 is a flow chart of a process using group I ore as raw material;

FIG. 3 is a flow chart of a process using group II ore as raw material;

FIG. 4 is a flow chart of a process using group III ore as raw material;

FIG. 5 is across-sectional view of a Hall-Heroult cell modified for the present invention; and FIG. 6 is a cross-sectional view of a Downs cell modified for the present invention.

DETAILED DESCRIPTION OF THE PREFERRED EMBODIMENT

Referring to the table of FIG. 1, as shown in column 3, the beginning of fusion for mixtures of potassium-aluminum sulfate $[KAl(SO_4)_2]$ and potassium sulfate $(K_2SO_4)$, occurs within a temperature range of approximately 600 degrees centigrade, close to the eutectic temperature, from about 50/50 to about 15/85 (herein "mixture" refers to the respective weight ratios of $KAl(SO_4)_2$ to $K_2SO_4$). The beginning of fusion at about this temperature actually extends further in the lower/higher direction but a weight ratio without a sharply defined resolidification temperature, as shown in FIG. 1, column 4, is preferred. The electrolytic processes described in the following are conservatively based on mixtures ranging from approximately 50/50 to 15/85 for a temperature of about 700 degrees Centigrade. The specific weight of a molten mixture at this temperature within the range from less than 50/50 to 15/85 is about 2.1, that is 0.95 times than that of aluminum (which is about 2.2). FIG. 1 also shows a similar temperature relationship for sodium based sulfate mixtures.

Aluminum ores can be grouped as follows:

I) aluminum hydrate ores, known as "bauxites" and including gibbsite, boehmite and diaspore, which are low in silicon and high in iron;

II) aluminum silicate ores, known as "clays" and including kaolinite, halloysite and mica are found worldwide separately and in clays found in oil sands, are high in silicon and comparatively low in iron;

III) alunite and zeolite, which comprise potassium-aluminum sulfate, found in clays in oil sands and oil/clay water emulsions as a byproduct of oil production from oil sands like those at the Canadian Athabacsa deposit; and IV) dawsonite ores containing aluminum and sodium salts found in oil shales.

A preferred embodiment of the present invention, is depicted by a process 20 in FIG. 2, relating to the processing of group I ores. From a supply of raw material, the process 20 follows the conventional Bayer alumina refinement process. The ore is "calcinated" in a roasting step 22 raising the ore's temperature to about 600 degrees centigrade to drive out the hydration water. Sodium hydroxide (NaOH) is added and in an autoclaving step 24 sodium aluminate is formed in leach liquor. Leach liquor is defined as an acidic or alkaline aqueous solution containing metal salts from ore. Leach liquor containing aluminum hydroxide $[Al(OH)_3]$ is removed in a filtration step 26 from the slurry digested in autoclaves. After crystallization of the aluminum hydroxide in a step 28 by seeding with fine aluminum hydroxide and cooling, the crystals are dried in step 30. Crystallization serves here and in other processes as a means for the removal of impurities. The crystals are then converted in a heated fluidized bed reactor 32, upon reaction with gaseous byproduct $SO_3$, into aluminum sulfate $[Al(SO_4)_3]$ according to reaction $$2Al(OH)_3 + 3SO_3 \rightarrow Al_2(SO_4) + 3H_2O. \tag{6}$$

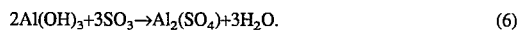

A subsequent dehydration step 34 may be combined with step 32. After dehydration 34, the aluminum sulfate is fed into an electrolytic cell 36 where the following processes take place:

a) aluminum sulfate is converted to potassium-aluminum sulfate using potassium sulfate $$Al_2(SO_4)_3 + K_2SO_4 \rightarrow 2KAl(SO_4)_2; \text{ and} \tag{7}$$

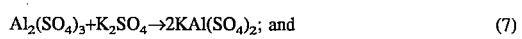

b) the overall electrolysis reaction at temperatures above the eutectic temperature is according to equations (1) and (2).

Electric current, about 0.5 to one amp per sqcm, is passed through the molten mixture and produces molten aluminum at the cathode and $SO_4$ ions at the anode. The aluminum is tapped off into ingots directly from the pool or by means of a siphon. The $SO_4$ ions decompose into $SO_3$ and $O_2$ which are utilized for producing sulphuric acid $[H_2SO_4]$ and aluminum sulfate $Al_2(SO_4)_3$ directly in a fluidized bed in the reaction of equation (6). This process recycles the $SO_3$ as well as the $K_2SO_4$. It is well suited for processing group I ores in a Hall-Heroult cell.

FIG. 3 illustrates a process 50, another embodiment of the present invention. Aluminum ore is dried or calcined in a step 52, then mixed in a step 54 with sulfuric acid to cause agglomeration, which is a clustering of fine particles into larger ones with the acid acting as binding agent. The agglomerate is retained at its exothermic temperature for a period of time depending on the ore (about 30 minutes for Athabasca clay), then leached in a step 56 with hot water and filtered in a step 58 to obtain leach liquor containing aluminum sulfate [$Al_2(SO_4)_3$]. An option before crystallization 60 is iron removal by electrolysis. After crystallization 60 impurities are removed to the desired degree, the aluminum sulfate is dehydrated in a step 62 and then fed into an electrolytic cell 64. The electrolytic decomposition follows equations (1), (2) and (7). Byproduct gas $SO_3$ is reacted with 93% $H_2SO_4$ which absorbs the $SO_3$ per

$$SO_3 + H_2O \rightarrow H_2SO_4 \qquad (8)$$

with the resulting sulfuric acid (68) being recycled for the agglomeration step 54. This sulfuric acid process is well suited for the processing of group II ores in a Hall-Heroult cell.

Another embodiment of the present invention is depicted in FIG. 4 wherein a process 80 uses group III ores and is similar in most steps to process 50. After drying or calcination 82, agglomeration with sulfuric acid 84, leaching with hot water in a step 86 and then filtering in a filtration step 86 the resulting leach liquor is mixed with spent electrolyte 89. The electrolyte 89 comprises potassium-aluminum sulfate and potassium sulfate in a mixture of about 15/85, to be fed together with leach liquor from filtration step 88 into crystallization process 90. When no spent electrolyte is available, fresh potassium sulfate is added at this point as illustrated by step 97. The mixture is then crystallized in step 90 and dehydrated in step 92, preferably by spray-drying, to be fed into an electrolytic cell 94 for electrolytic decomposition according to equations (1) and (2). Again, byproduct gas $SO_3$ is converted in a step 98 into sulfuric acid (98), according to equation (8), to be recycled to the agglomeration step 84. This kind of sulfuric acid process is well suited for the processing of group III ores.

The processing of group IV ores can be carried out by processes 20, 50 or 80 with the potassium ion substituted by a sodium ion.

The cell embodiments hereafter described can be used to implement either process 20, 50 or 80.

In an electrolytic cell, e.g. Hall-Heroult or other type, by the addition of fresh feed according to equations (1) and (2), the molten mixture is maintained at a ratio of 50/50 or less at the entry edge of the electrodes. The electrolyte slowly moves between the electrode pairs, while the electrolytic decomposition of equation (2) takes place, to the exit edge of the electrodes where it arrives at a depleted ratio of about 15/85. The movement of the mixture between the electrodes is accomplished by flow pressure exerted by a pump, by heat convection, gravity, and specific weight differences or any combination of them.

The heat loss generated by the ohmic resistance between the electrodes contributes to the maintenance of the cell temperature.

Gaseous products liberated at the anode, if not removed, would cause an increase of resistance in the electrolyte path between the electrodes, thus substantially decreasing the electrolytic efficiency of the cell. The use of a perforated sheet or mesh as anode together with the forced recirculation of the electrolyte by a pump are essential means for maintaining the lowest possible cell voltage. The electrolytic efficiency of a cell is thereby maximized.

A porous conducting membrane, made out of ceramic or other suitable material and placed between the anode and the cathode, prevents the ions precipitating on either side from recombining and permits an increase in electrolytic current density which increases cell productivity.

The process of the present invention may be conducted in a modified Hall-Heroult cell 100 comprising a crucible 120 and a fitting cover 122 as depicted in FIG. 5. Cover 122 is penetrated by a pair of electrical conduits 127 and 129, which are in electrical contact with a pair of electrodes 130 and 132, respectively. Also penetrating the cover 122 is an inlet 134, an inlet 136, an outlet 138, an outlet 140 and an outlet 142.

Crucible 120 and cover 122 comprise an inert material. Hall-Heroult cell crucibles commonly comprise steel with an inner surface lining of graphite. Crucible 120 forms an upper pool 150 to contain molten sulfates floating on a lower pool 152 of molten aluminum and separated from it by membrane 153. Crucible 120 is surrounded by an insulation 154 to maintain a suitable temperature of pool 150 and pool 152 between 700 and 900 degrees Centigrade.

Several feed-throughs extend through cover 122, including:

a) electrical conduit 127 connected to the sheet electrode 130 at the bottom of crucible 120;

b) electrical conduit 129 connected to the sheet electrode 132 at the top of crucible 120;

c) inlet 134 forming a tube holding a feeder (e.g. injection, screw, etc.) for introducing fresh feed into pool 152;

d) inlet 136 which permits the recirculation of depleted molten mixture of about 15/85 into pool 150 via a pump 162;

e) outlet 138 which provides for draining depleted molten sulfate mixture for recirculation via pump 162;

f) outlet 140 which dips into lower molten aluminum pool 152 to serve as the removal port for siphoning of liquid aluminum from crucible 120 for the casting of ingots. Outlet 140 is surrounded by an insulation 164 to maintain the drained aluminum in a liquid state; and g) outlet 142 provides for the exhaustion of byproduct gases $SO_3$ and $O_2$ from cell 100.

Outlet 168 on the pressure side of pump 162 allows for removal of spent electrolyte during the use of process 80.

Negative sheet electrode 130 is comprised of an inert material, e.g. titanium diboride or graphite, and is submerged in and electrically connected to the lower molten aluminum pool 152. The actual cathode of the electrolytic cell is the surface of aluminum pool 152 facing molten sulfate pool 150, on which membrane 153 floats on pool 152.

Positive electrode 132 serving as anode is submerged in and in electrical contact with molten sulfate pool 152 comprise a porous sheet or mesh to facilitate the escape of gaseous byproducts $SO_3$ and $O_2$ to the upper surface of pool 152 and is structured from an inert material like graphite or cermet.

Aluminum globules precipitating at electrode 130 stay within the aluminum pool 152 because of surface tension forces and the membrane 153 floating on top of pool 152. Presently used Hall-Heroult cells operate at a voltage of about five volts, at a current of about 220,000 amperes and a current density of about 0.5 amps per sqcm.

Another embodiment is depicted in FIG. 6 which includes an electrolytic cell 200, similar to a Downs cell used in the electrolytic decomposition of molten sodium chloride, and comprising a crucible 220 and a cover 222.

Cover 222 is penetrated by electrical conduits 227 and 229, which are in electrical contact with parallel electrodes 230 and 232, respectively, and by outlet 240 and outlet 242. Crucible 220 is penetrated by an inlet 244, an inlet 246 and an outlet 248.

Crucible 220 holds a pool 250 of molten mixture and a pool 252 of molten aluminum. Electrode 230 and electrode 232 extend vertically into pool 250 and serve as cathode and anode, respectively, separated by membrane 253.

Inlet 244 may be in the form of a tube holding a feeder (e.g. injection, screw, etc.) for introducing fresh feed into pool 250 near outlet 248. Outlet 248 drains this molten mixture for recirculation via pump 262 to inlet 246.

Outlet 240 serves as the removal port for draining molten aluminum from pool 252 for the casting of ingots. It is surrounded by an insulation 254 to maintain the drained aluminum in a liquid state. Outlet 242 allowes for the exhaustion of byproduct gases $SO_3$ and $O_2$ from cell 200.

Crucible 220 and cover 222 are also connected to said membrane 253 which separates electrodes 230 and 232, surrounding electrode 230 vertically and horizontally to separate pool 252 and pool 250. Membrane 253, which may be made out of a ceramic material, also serves to contain the slightly denser aluminum pool 252 above the molten mixture pool 250 for easy aluminum topside removal via outlet 240. Membrane 253 prevents precipitated aluminum from causing a short circuit between the electrode pair 230 and 232.

The electrode materials and the current density of the embodiment of FIG. 6 are similar to those described for the embodiment of FIG. 5.

The molten mixture is kept at a 50/50 ratio or less at the lower end of the parallel electrodes 230 and 232 by the injection of both dry mixture and depleted molten mixture via inlet 246. The mixture slowly moves upwards between the electrodes, while the electrolytic decomposition of equations (1), (2) and (7) takes place, to their upper end where it arrives with a depleted 15/85 ratio. Fresh mixture fed in via inlet 244 regenerates the molten mixture to approximately a 50/50 ratio and outlet 248 drains it to pump 262 which recirculates it back to inlet 246. Outlet 268 on the pressure side of pump 262 allows the removal of spent electrolyte during the use of process 80.

As mentioned before, the specific weight of the molten mixture within the range from 50/50 to 15/85 is about the same as for aluminum at 700 degrees Centigrade.

FIG. 5 and FIG. 6 above describe monopolar cells, having only one electrolysis cell with electrodes in any spatial position. The processes described above and depicted in FIG. 2 to 4 can also be implemented in bipolar cells having a plurality of cells electrically connected in series.

Although the present invention has been described in terms of the presently preferred embodiments, it is to be understood that such disclosure is not to be construed as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An electrolytic method for producing aluminum, comprising the steps of:

mixing at least one of a double salt potassium-aluminum sulfate $2KAl(SO_4)_2$ and aluminum sulfate $Al_2(SO_4)_3$ with potassium sulfate $K_2SO_4$ to form a mixture having a weight ratio of $2KAl(SO_4)_2$ to $K_2SO_4$ in the range of 50/50 to 15,85, respectively, and providing for a eutectic melting temperature of about 700 degrees Centigrade;

enclosing said mixture in a covered crucible;

heating said mixture in said covered crucible to a molten state in the range of 600–900 degrees Centigrade;

applying an electric voltage across a positive and a negative pair of electrodes in said molten mixture to establish an electric current of about 0.5–1.0 amperes per square centimeter and sufficient to cause an electrolytic decomposition according to, $$2KAl(SO_4)_2 \rightarrow K_2SO_4 + Al_2 + 3(SO_3 + O), \text{ and}$$

$$Al_2(SO_4)_3 \rightarrow Al_2 + 3(SO_3 + O),$$

removing a precipitate of molten aluminum at said negative electrode;

removing gases of $SO_3$ and $O_2$ from decomposing ions of $SO_4$ at said positive electrode; and adding additional amounts of $2KAl(SO_4)_2$ as feedstock to said molten mixture in said crucible to maintain said particular weight ratio of said mixture.

2. The method of claim 1, wherein:

the step of mixing is such that said weight ratio results in a non-sharply-defined resolidification temperature and said mixture has a specific weight of about 0.95 times that of aluminum.

3. The method of claim 1, further comprising the step of:

producing sulfuric acid $H_2SO_4$ from said removed gases of $SO_3$ and recycling for agglomeration of aluminum ore.

* * * * *